United States Patent [19]

Schmidhalter

[11] Patent Number: 5,660,864

[45] Date of Patent: Aug. 26, 1997

[54] APPARATUS FOR INTRODUCING INJECTION MATERIAL INTO A MOLD

[75] Inventor: Erich Schmidhalter, Lengnau, Switzerland

[73] Assignee: Bucher-Guyer, Zurich, Switzerland

[21] Appl. No.: 518,811

[22] Filed: Aug. 24, 1995

[30] Foreign Application Priority Data

Sep. 2, 1994 [DE] Germany .................. 44 31 264.4

[51] Int. Cl.$^6$ ..................................... B29C 45/77
[52] U.S. Cl. .................. 425/145; 264/40.7; 425/149; 425/206; 425/207; 425/542
[58] Field of Search ....................... 425/145, 149, 425/207, 208, 542, 40.7

[56] References Cited

U.S. PATENT DOCUMENTS 3,888,393  6/1975  Drori ........................ 425/207
4,734,025  3/1988  Kawamura et al. ........... 425/145

FOREIGN PATENT DOCUMENTS 0 078 926   12/1987  European Pat. Off. .
699 513 A1   3/1996  European Pat. Off. .
9218241 U   12/1993  Germany .
2 108 423 B   4/1996  United Kingdom .

Primary Examiner—Tim Heitbrink
Attorney, Agent, or Firm—Burns, Doane, Swecker & Mathias, LLP

[57] ABSTRACT

By embodying a feed screw (17) for glass fiber reinforced polyester material with a hollow shaft, it is possible for the injection piston (11) for an injection unit (9) to have a compact structure so as to be passed through the feed screw (17). To process even viscous polyester compositions gently, the injection piston can be equipped with a plasticizer screw and an associated plasticizer motor.

7 Claims, 5 Drawing Sheets

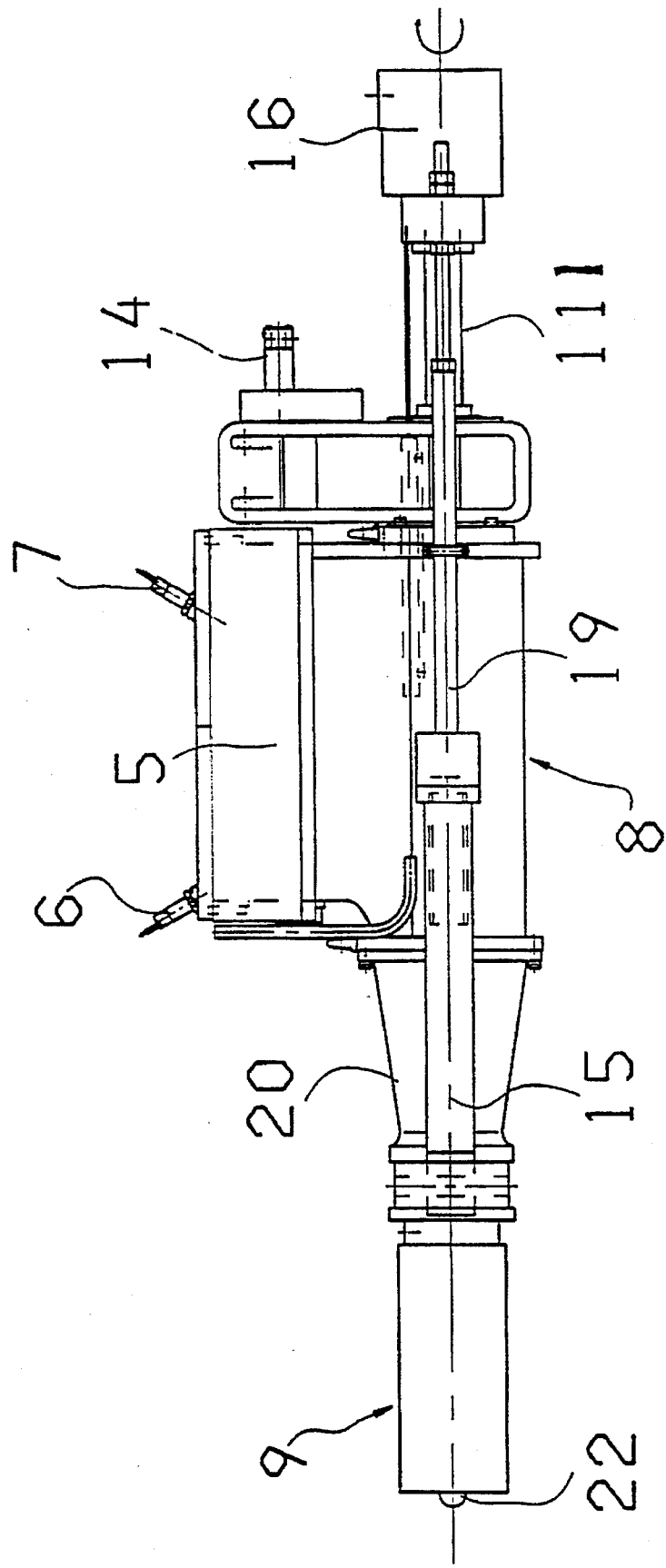

5,660,864

APPARATUS FOR INTRODUCING INJECTION MATERIAL INTO A MOLD

FIELD OF THE INVENTION

The invention relates to an apparatus for introducing an injection material into a mold, having a screw conveyor, an injection unit that has an injection piston, and a container for receiving the injection material, such as glass fiber reinforced polyester material.

BACKGROUND OF THE INVENTION

German Utility Model 92 18 241 (Fahr Bucher GmbH) discloses an apparatus for charging a plasticizer device. A refill container is charged with polyester or similar materials. Connected to the refill container is a screw conveyor, which feeds the polyester to a stuffing unit equipped with a piston and a cylinder. The stuffing unit in turn injects the polyester via an injection nozzle into an injection mold. This apparatus is complicated and expensive in design, and its design puts a heavy strain especially on glass fiber reinforced materials.

European Patent Disclosure EP B1 0 078 926 (Hetting, Siebolt) discloses a method for injecting an injection material into a mold. The method uses a demarcated path, which includes a screw for conveying the injection material, an injection nozzle unit, and an injection mold. Via an outlet laterally protruding from the demarcated path, the injection nozzle unit is filled with injection material by means of a motion of the path relative to the injection nozzle unit. Next, the component group comprising the demarcated path and the injection nozzle unit is moved to the injection mold, which in turn is filled by means of a relative motion between the path and the injection nozzle unit. This method again requires a complicated design and puts a heavy burden on the material.

SUMMARY OF THE INVENTION

An object of the invention is to avoid these disadvantages. According to the invention, a feed screw of a screw conveyor is connected to the receiving container and is embodied as a hollow shaft. The injection piston penetrates this hollow shaft and, by means of the injection unit disposed at the outlet of the screw conveyor, introduces the injection material into the mold by an axial motion.

It proves to be especially advantageous if the front end of the injection piston located in the injection unit is provided with a reflux barrier. Other preferred embodiments are defined in the claims.

The invention is explained in further detail in the ensuing description and in the drawings, which show the exemplary embodiments.

BRIEF DESCRIPTION OF THE DRAWINGS

FIG. 5 is a side view of the injection apparatus of FIG. 4.

DETAILED DESCRIPTION OF PREFERRED EMBODIMENTS

Figure 1:
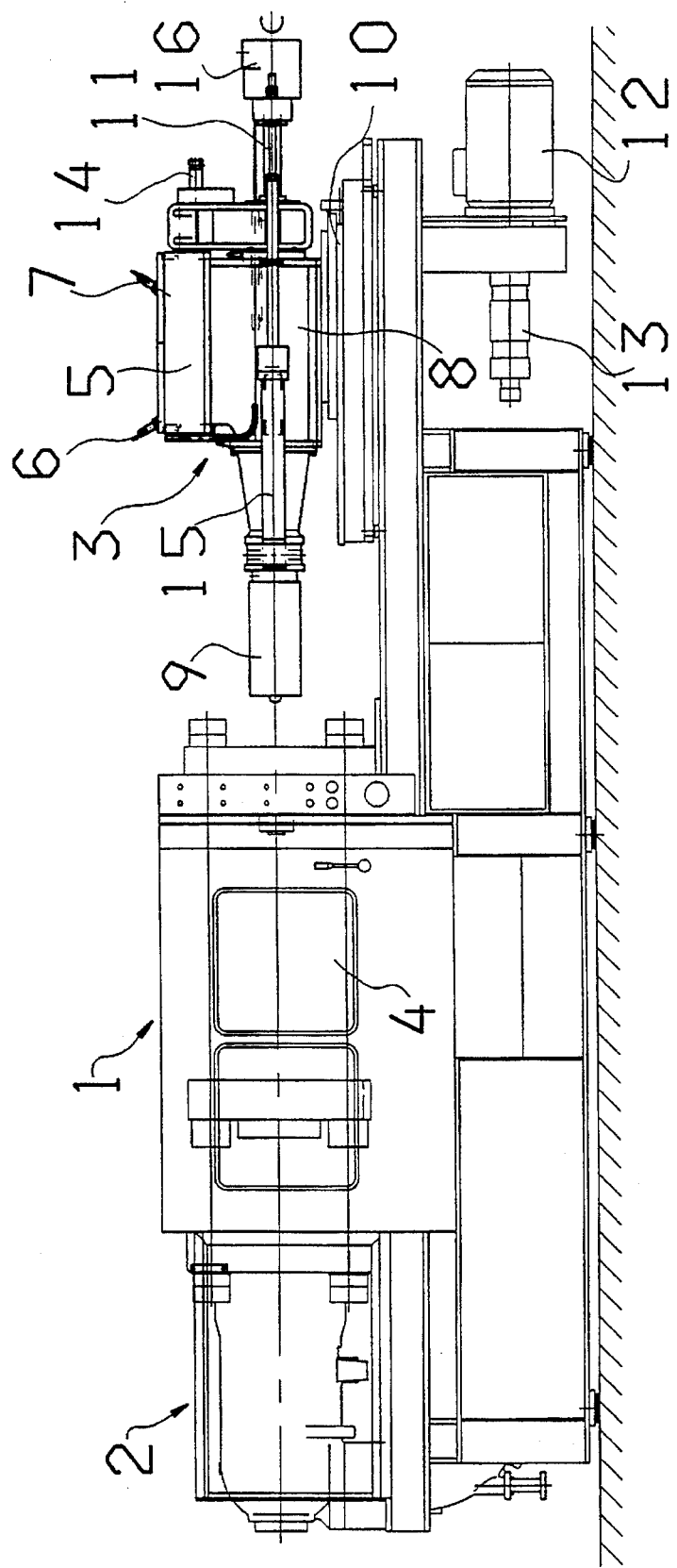
FIG. 1 is a side view of an injection system for products made of plastic, having a charging unit, molding unit, and mold positioning unit.

The injection molding system shown schematically in FIG. 1 includes a molding unit 1 for the insertion and retention of an injection mold, not otherwise shown; a positioning unit 2 for one part of the injection mold; and a unit 3 embodied according to the invention for charging the injection mold with injection material, such as glass fiber reinforced polyester material.

In the molding unit 1, an injection mold not shown is mounted in an opening 4. This injection mold comprises two parts, which enclose a hollow space for the material to be injected. The first part is mounted on the side toward the charging unit 3 and has an injection opening for the polyester material. The second part of the injection mold is opposite the first and can be moved sealingly to the first part with a compressive force, by a hydraulic mechanism in the positioning unit 2. Once the product has been made, the second part of the injection mold is retracted again, and the finished product is expelled.

The charging unit includes a container 5 for receiving the material to be injected, on which two sensors 6, 7 for the fill level are mounted. With the aid of a screw conveyor 8 connected to the receiving container 5, the injection material is fed into an injection unit 9. As shown particularly in FIGS. 2 and 4, charging unit 3 has a feed screw 17 extending across a lower portion of the container 5 in open communication along the length of the container with the injection material therein. The presence of such a large opening between the material container and the feed screw is important in the handling of glass fiber reinforced polyester and duroplastic compositions because the imposition of excessive stress on the injection material must be avoided. For the injection operation, the charging unit 3 is moved along a bed 10 to the injection mold mounted in the molding unit 1. Next, the injection material is injected out of the injection unit 9 into the injection mold by means of an injection piston 11. As described in detail below in conjunction with FIG. 4, the injection piston 11 can be provided, in its region between the screw conveyor 8 and the injection unit 9, with a plasticizer screw (23) for the injection material from the screw conveyor 8.

Figure 3:
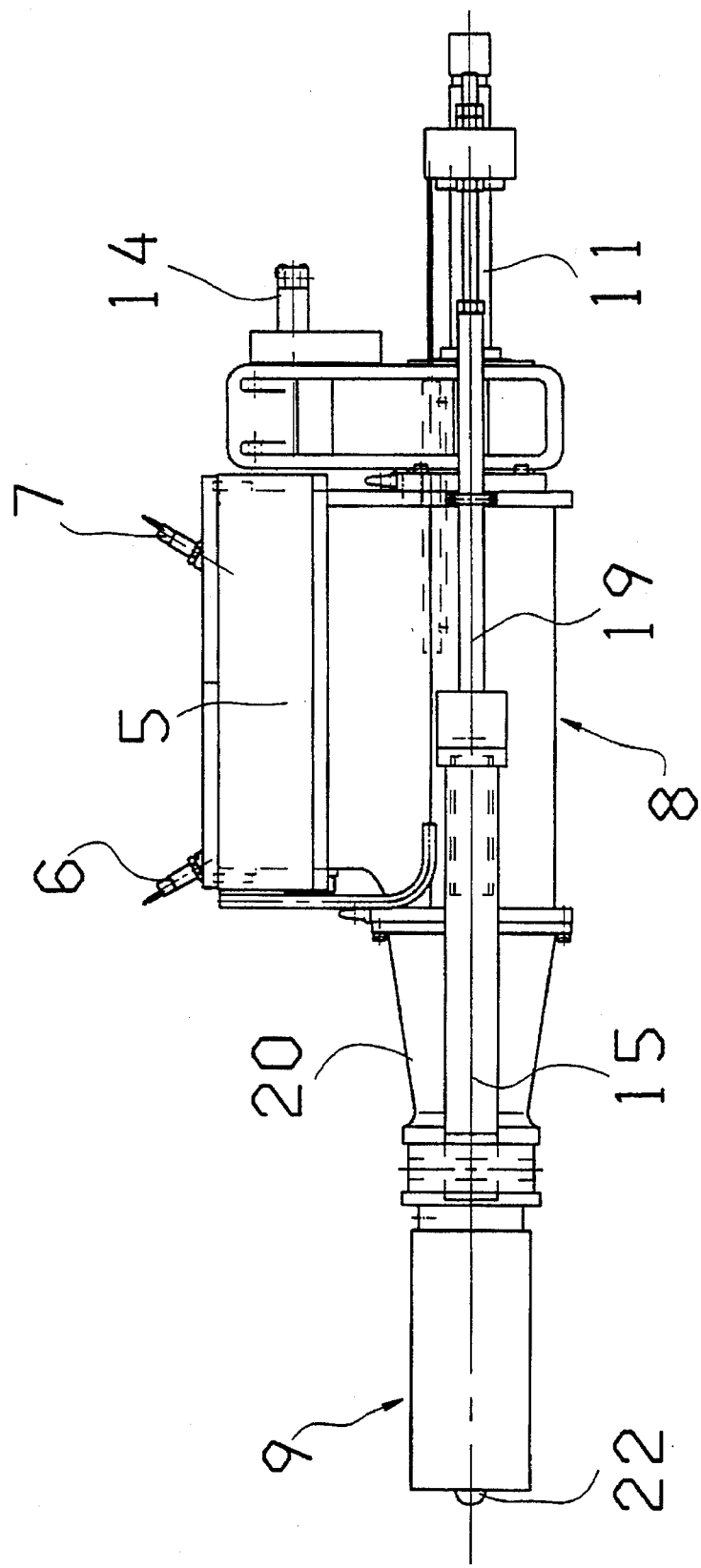
FIG. 3 is a side view of the injection apparatus of FIG. 2.

For driving the moving and feeding devices of the charging unit 3, a hydraulic pump 13 driven by an electric motor 12 is provided, as shown in FIG. 1. From this pump 13, feed lines not shown lead to a drive motor 14 for the screw conveyor 8, to two hydraulic cylinders 15 for the linear drive of the injection piston 11, and to a motor 16 for driving the plasticizer screw of the injection piston 11. The injection piston 11 is connected to the hydraulic drive cylinders 15 via piston rods 19 as shown in FIG. 3 so that it may be displaced longitudinally upon actuation of the cylinders.

Figure 2:
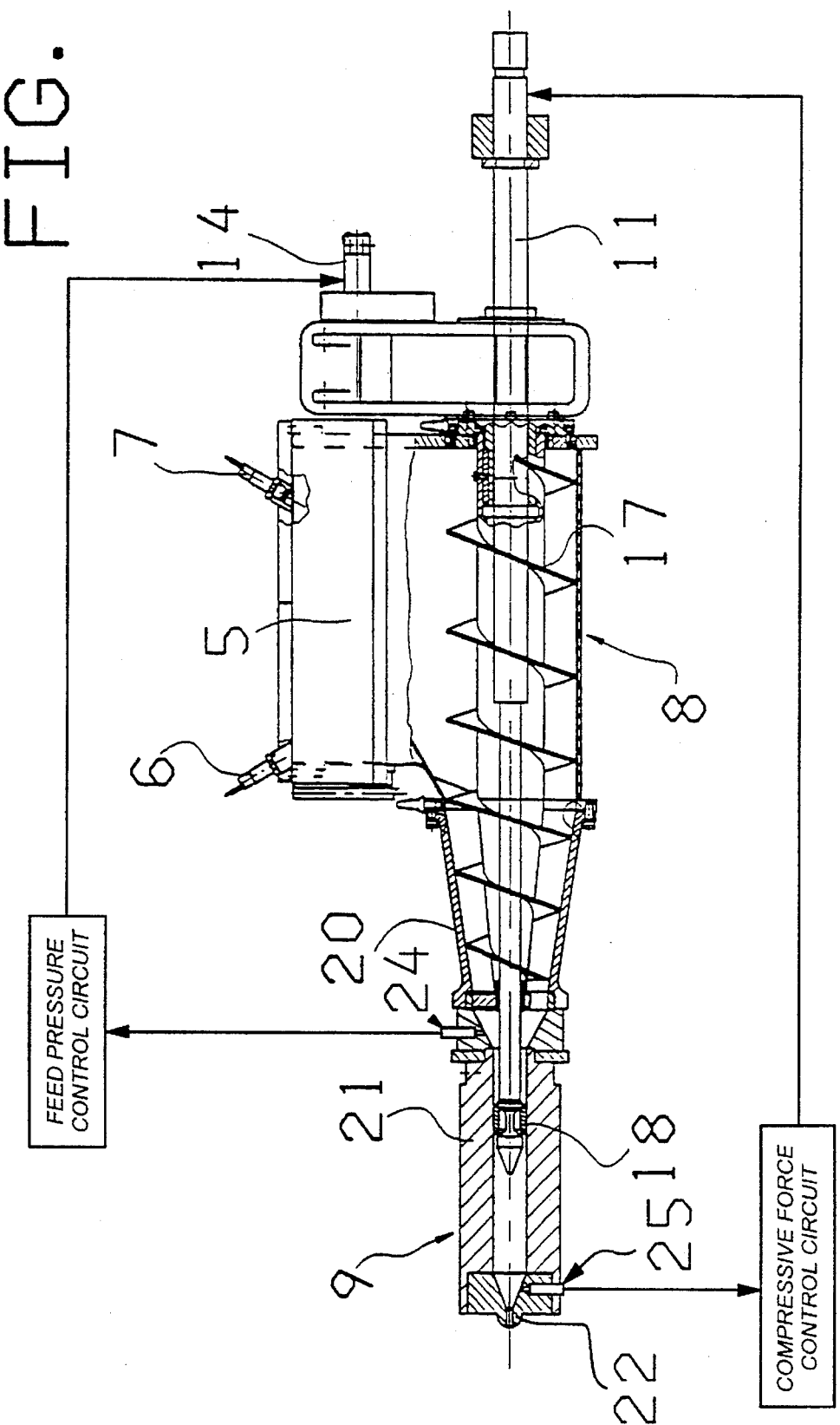
FIG. 2 is a section through an injection apparatus according to the invention of the charging unit of FIG. 1.

In FIG. 2, an injection apparatus having a charging unit 3 according to the invention is shown in a more detailed fragmentary section. The corresponding side view is shown in FIG. 3. The components already described in conjunction with FIG. 1 are identified by the same reference numerals in FIGS. 2, 3, 4 and 5. As FIG. 2 shows, the screw conveyor 8 includes a feed screw 17 on a hollow shaft. The injection piston 11 is guided for longitudinal displacement through this hollow shaft. The injection piston 11 has a reflux barrier 18 on its front end in the injection unit 9.

The feed screw 17 draws in the material located in the container 5. As a result of the feed operation, a compression in the discharge direction toward the injection unit 9 is generated that eliminates trapped air and homogenizes the composition. The stuffing pressure is built up in a following, conically tapered region 20 of the screw conveyor 8 and pushes the composition between the injection piston 11 and a plasticizer cylinder 21 that in spaced-apart fashion surrounds the piston 11, in front of the reflux barrier 18, where it accumulates in front of an injection nozzle 22. The accumulation pressure, possibly reinforced by a regulated retraction force on the injection piston 11, then presses that piston backward until a sufficient shot volume has built up in the composition.

A known type of suitable reflux barrier 18 includes a longitudinally shiftable ring component disposed between axially spaced apart inclined shoulder portions of the injection piston structure. The outer cylindrical surface of the ring provides a seal with the bore of the plasticizer cylinder 21, while the inner surface of the ring is spaced radially from the outer surface of the piston 11. The end of the ring located nearest the outlet of the cylinder 21 is provided with protrusions that mate with a shoulder on the piston 11 when the plastic material is being plasticized and pressurized by the screw 17, but the ring does not, in this condition of the components, prevent flow of the plastic to the space in front of the piston 11. However, when the piston 11 is moved to the left in FIG. 2, the ring shifts rearwardly a short distance along the piston 11 into sealing engagement with an inclined shoulder fixed on the piston to prevent back flow or reflux of the plastic with respect to the advancing piston. Such reflux barriers are known in the art and need not be described further here. An example of a suitable structure is illustrated and described in detail in GB 2 108 423 (published May 18, 1983), the disclosure of which is incorporated herein by reference in its entirety.

The hydraulic drive cylinders 15 for the injection piston 11 are supported directly on the plasticizer cylinder 21. As a result, the container 5 is not strained by the injection force.

For gentle treatment of the composition in the injection operation, the screw conveyor 8 may be followed by a first pressure sensor 24 whose output acts upon a closed loop feed pressure control circuit (FIG. 2) that regulates the feed capacity of the screw conveyor as a function of the sensed pressure of the injection material. A second pressure sensor 25 may be disposed to sense the injection material before its exit from the injection unit 9. The output from such second pressure sensor 25 acts upon a closed loop compressive force control circuit (FIG. 2) that regulates the compressive force at the injection piston 11 as a function of the pressure of the injection material.

Figure 4:
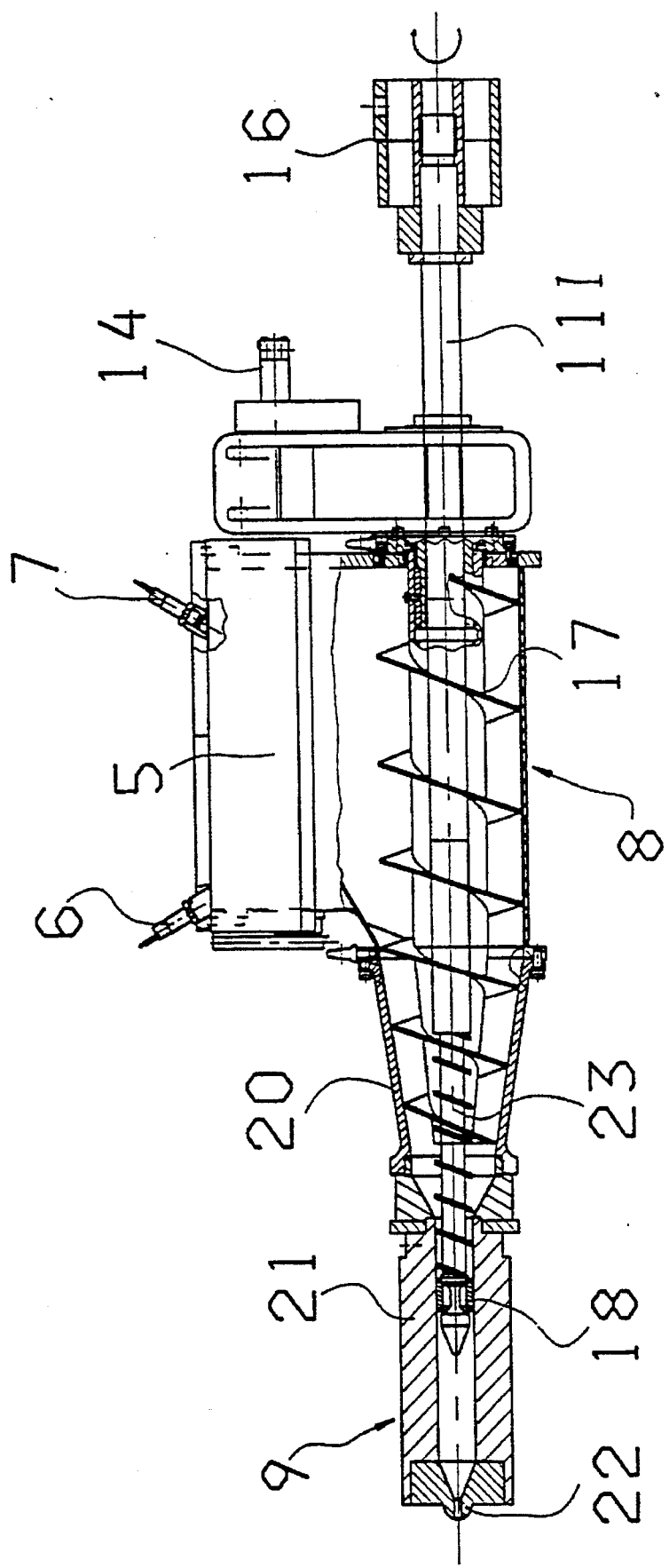
FIG. 4 is a section through a further injection apparatus according to the invention.

With the apparatus of FIGS. 1, 2, 3, low-viscosity polyester compositions can be processed. To enable processing more viscous polyester compositions or duroplastic compositions in the form of pellets, the apparatus of FIG. 4 is suitably equipped with a plasticizer screw 23 at the injection piston 111, in the zone to the right of the reflux barrier 18 in FIG. 4. The motor 16 then serves to drive this plasticizer screw 23. In this form the apparatus can also be used for shredded compositions produced in thermorecycling, if the plasticizer cylinder 21 is embodied as a long thermocylinder of enlarged diameter.

What is claimed is:

1. An apparatus for introducing glass fiber reinforced polyester injection material into a mold, said apparatus comprising a container for receiving the material to be injected, a rotatable screw conveyor connected to the receiving container and having a feed screw extending across a lower portion of said container in open communication along the length of said container with the glass fiber reinforced polyester injection material therein, said screw conveyor being embodied as a hollow shaft, injection piston penetrating said hollow shaft, and an injection unit for receiving said injection material advanced from the outlet of the feed screw, said injection piston being axially reciprocable lengthwise in said hollow shaft to introduce the injection material from said injection unit into the mold.

2. The apparatus of claim 1, wherein the front end of the injection piston is located in the injection unit and is provided with a reflux barrier.

3. The apparatus of claim 1, wherein an outlet end portion of said screw conveyor has a conically tapered region to increase the pressure in the advancing injection material.

4. The apparatus of claim 1, wherein the injection unit includes a plasticizer cylinder having a volume at least equivalent to that of the hollow space in the injection mold, said plasticizer cylinder being filled with injection material by the screw conveyor before said injection piston is moved axially to move the injection material out of said plasticizer cylinder into the mold, said injection piston being fitted loosely into the plasticizer cylinder to allow the injection material to move past the piston and apply pressure to move the piston in a rearward direction prior to a forward axial injection motion.

5. The apparatus of claim 4, wherein said injection piston is tightly fitted, by a reflux barrier on a from portion thereof, into the plasticizer cylinder, and wherein said piston has a plasticizer screw adjacent said reflux barrier for introducing the injection material from the screw conveyor through the reflux barrier into the plasticizer cylinder when said injection piston is rotated.

6. The apparatus of claim 1, wherein the outlet of the screw conveyor is followed by a first pressure sensor, whose output signal acts upon a closed-loop control circuit that regulates the feed capacity of the screw conveyor as a function of the pressure of the injection material.

7. The apparatus of claim 6, wherein a second pressure sensor is disposed in the injection material before its exit from the injection unit, the output signal of which sensor acts upon a closed-loop control circuit that regulates the compressive force at the injection piston as a function of the pressure of the injection material.

* * * * *

UNITED STATES PATENT AND TRADEMARK OFFICE
CERTIFICATE OF CORRECTION

| | | |
|---|---|---|
| PATENT NO. | : | 5,660,864 |
| DATED | : | August 26, 1997 |
| INVENTOR(S) | : | Erich SCHMIDHALTER |

It is certified that error appears in the above-identified patent and that said Letters Patent is hereby corrected as shown below:

<u>ON THE TITLE PAGE</u>

[73]    Assignee:    Delete "Bucher-Guyer" and insert therefor --Fahr Bucher GMBH--.

Signed and Sealed this

Ninth Day of December, 1997

Attest:

BRUCE LEHMAN

Attesting Officer

Commissioner of Patents and Trademarks